(12) United States Patent
Erskine (10) Patent No.: US 9,541,128 B2
(45) Date of Patent: Jan. 10, 2017

(54) ACOUSTIC EMISSION MEASUREMENTS OF A BEARING ASSEMBLY

(71) Applicant: AKTIEBOLAGET SKF, Göteborg (SE)

(72) Inventor: Joseph Erskine, Falkirk (GB)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/395,503

(22) PCT Filed: Dec. 17, 2012

(86) PCT No.: PCT/EP2012/075847
§ 371 (c)(1),
(2) Date: Jan. 30, 2015

(87) PCT Pub. No.: WO2013/159840
PCT Pub. Date: Oct. 31, 2013

(65) Prior Publication Data
US 2015/0300405 A1    Oct. 22, 2015

Related U.S. Application Data

(60) Provisional application No. 61/637,556, filed on Apr. 24, 2012.

(51) Int. Cl.
| | | |
|---|---|---|
| F16C 33/76 | (2006.01) | |
| F16C 19/52 | (2006.01) | |
| F16J 15/32 | (2016.01) | |
| G01M 3/24 | (2006.01) | |
| G01M 3/28 | (2006.01) | |
| G01M 13/04 | (2006.01) | |
| G01L 5/00 | (2006.01) | |
| F16C 33/78 | (2006.01) | |

(52) U.S. Cl.
CPC ............ *F16C 19/527* (2013.01); *F16C 33/76* (2013.01); *F16C 33/783* (2013.01); *F16C 33/7846* (2013.01); *F16J 15/3296* (2013.01); *G01L 5/0019* (2013.01); *G01M 3/24* (2013.01); *G01M 3/2869* (2013.01); *G01M 13/045* (2013.01)

(58) Field of Classification Search
CPC ..... F16C 19/527; F16C 32/0648; F16C 33/76; F16C 33/783; F16C 33/7846; F16J 15/3296; G01M 13/045; G01M 3/2869; G01M 3/24; G01L 5/0019
See application file for complete search history.

(56) References Cited

U.S. PATENT DOCUMENTS

| | | | | |
|---|---|---|---|---|
| 3,628,837 A | * | 12/1971 | Otto ..................... | F16C 33/80 384/462 |
| 5,975,533 A | * | 11/1999 | Hubbard ................ | F16C 19/34 277/351 |
| 6,053,637 A | * | 4/2000 | Cacciatore ............. | B61D 43/00 384/448 |

(Continued)

*Primary Examiner* — Alan B Waits
(74) *Attorney, Agent, or Firm* — Bryan Peckjian; SKF USA Inc. Patent Dept.

(57) ABSTRACT

A bearing assembly comprising a rolling element bearing and an acoustic emission unit. The rolling element bearing is provided with at least a bearing seal, wherein the acoustic emission unit is arranged on the bearing seal. The assembly also provides an improved method for measuring acoustic emissions in a bearing assembly.

14 Claims, 5 Drawing Sheets

(56) References Cited

U.S. PATENT DOCUMENTS

| | | | | |
|---|---|---|---|---|
| 6,561,559 | B1* | 5/2003 | Skiller | B61F 15/20 |
| | | | | 295/36.1 |
| 7,293,919 | B2* | 11/2007 | Ueno | F04B 23/025 |
| | | | | 384/462 |
| 2002/0015747 | A1 | 2/2002 | Mitamura | |
| 2006/0013747 | A1 | 1/2006 | Chiu | |
| 2006/0137471 | A1* | 6/2006 | Sentoku | B60B 27/0005 |
| | | | | 73/862.322 |
| 2011/0026556 | A1 | 2/2011 | Fujita et al. | |

* cited by examiner

ACOUSTIC EMISSION MEASUREMENTS OF A BEARING ASSEMBLY

CROSS REFERENCE TO RELATED APPLICATIONS

This is a National Stage application claiming the benefit of International Application Number PCT/EP2012/075847 filed on 17 Dec. 2012 (17 Dec. 2012), which claims the benefit of U.S. Provisional Patent Application No. 61/637,556 filed on 24 Apr. 2012, both of which are incorporated herein by reference in their entireties.

FIELD OF THE INVENTION

The present invention pertains to a bearing assembly comprising an acoustic emission unit. Additionally, the present invention pertains to a method for measuring acoustic emission of a bearing assembly.

BACKGROUND OF THE INVENTION

In bearing assemblies, such as rolling element bearings, there is often a need for monitoring the conditions of the components in order to determine the status of the components and possibly predict future failures. Monitoring the conditions is particularly important for bearing assemblies since they are used under extreme operating conditions which in turn result in that the materials and components are heavy-loaded. Various measurements can be used for monitoring the conditions of the components in a bearing assembly.

One particularly critical component in a bearing assembly is the lubricant, e.g. oil or grease. The main purpose of the lubricant is to prevent metallic contact between the rolling elements, raceways and cages and thus to prevent wear of the bearing assembly. The lubricant is also used for cooling and to protect the bearing surfaces against corrosion. Accordingly, it is central that the condition of the lubricant is monitored in order to ensure a reliable operation of the bearing assembly. That is, by measuring and monitoring the condition of the lubricant, it is possible to early detect if there is an insufficient lubrication.

It has been observed that in certain circumstances, the metallic contact, i.e. the asperity contacts, between the bearing raceway surface and the bearing rolling element may generate acoustic emissions (AE). Moreover, acoustic emissions can occur due to contamination within the lubricant, other metallic noise sources, roller skewing or skidding. Acoustic emissions may also result from the initiation and growth of cracks, slips and dislocation movements, twinning, or phase transformations in metals. Hence, acoustic emission generated from various sources is regarded as one significant and measurable indication of the condition of a bearing assembly. In view of this, there is an increasing demand for monitoring acoustic emissions in a bearing assembly.

As an example, acoustic emission measurements can be obtained by mounting an acoustic emission pickup sensor directly onto a bearing outer ring surface of a bearing assembly. Conventionally, this is carried out by attachment of the acoustic emission pickup sensor in a predefined groove or space in the radial plane of the outer ring. The attachment of the AE pickup sensor can for instance be done by gluing or by using pressure such that the sensor is firmly maintained on the bearing ring surface.

However, due to the construction of the bearing assembly, minor space is left for additional components in the bearing housing. It is therefore often problematic to mount various monitoring equipments and sensors in the bearing assembly, while maintaining a high level of accuracy and quality in the measurements. Accordingly, there is a need for an alternative solution for monitoring the conditions of a bearing assembly enabling improved and accurate acoustic emission measurements. In particular, it is desirable that a balance is kept between the size and the functionality of the monitoring components such that measurements can be carried out in mass-produced bearing assemblies.

SUMMARY OF THE INVENTION

In view of the above-mentioned and other drawbacks of the prior art, a general object of the present invention is to provide an improved bearing assembly comprising an acoustic emission (AE) unit such that acoustic emission measurements can be carried out in a reliable, simple and accurate manner. These and other objects are met by the subject-matters provided in the independent claims. Preferred optional features are recited in the associated dependent claims.

According to a first aspect of the present invention there is provided a bearing assembly comprises a rolling element bearing and an acoustic emission unit. The rolling element bearing is provided with at least a bearing seal. In addition, the acoustic emission unit is arranged on the bearing seal.

The present invention is based on the realization by the inventor that an improved measurement of the acoustic emissions is possible by the principle that the acoustic emission unit is arranged on the bearing seal. In this manner, the acoustic emission unit is arranged on a location in the rolling element bearing which is less exposed to physical contacts from various components, such as the bearing housing, whilst a high level of measurement accuracy is be maintained.

Accordingly, by the present invention, it becomes possible to measure acoustic emissions, sometimes also denoted acoustic emission signals. It has been found that by analyzing acoustic emission generated in a bearing assembly, e.g. sound pressure signals within a certain acoustic frequency range, it is possible to monitor, assess and quantify the condition of a bearing assembly, and in particular the condition of the lubrication condition. Hence, in this context, the term "acoustic emission" refers to the generation of sound in materials and stress. In particular, acoustic emission refers to transient elastic waves produced by a sudden redistribution of stress in a material. When a structure or component is subjected to an external stimulus, e.g. a change in pressure, load or temperature, the localized sources trigger the release of energy in the form of stress waves. The stress waves typically propagate to the surface of the structure or component, and can be measured in various ways with different equipment and set-ups.

Analysing and quantifying acoustic emission is a widely used technique for monitoring the condition of various safety-critical and production-critical systems. However, one example of a commonly known lubrication condition parameter is the specific film thickness. In another embodiment, the lubrication condition parameter used to indicate lubrication condition is viscosity ratio, $\kappa$. The viscosity ratio is a ratio of a lubricant's actual viscosity to a minimum, rated viscosity that the lubricant must possess at its normal operating temperature in order to form an adequate oil film. Both of these lubrication parameters are indicative of a degree of surface separation between rolling contact surfaces in a bearing and are likewise indicative of the degree of asperity contact. Accordingly, by measuring the acoustic emission of the lubricant, it is possible to determine various lubrication condition parameters as specified by the skilled person in the art.

By the provision that AE unit is arranged on the seal, it is not only possible to gather acoustic emissions measurements from the bearing seal, but also from various adjoining bearing structures, as mentioned below, e.g. the lubricant, the asperity contacts between the raceway surface and the bearing rolling elements, the metal support structure of the seal, other metal parts of the seal.

This is different from previous prior art solutions, which make use of an AE sensor mounted on the outer ring of the rolling element bearing and simply gather AE measurements directly from the bearing outer ring surface. As is clear from analysing the structure of a conventional bearing assembly, an AE sensor mounted on the outer ring is problematic since the surface of the outer ring may sometimes accidently get in contact with the bearing housing. In addition, since the bearing surface of the outer ring is not flat, it is typically required that the AE sensor is positioned in a recess of the outer ring. As such, even if the AE sensor is mounted in a recess of the outer ring or on its surface, a modification of the existing bearing housing or the bearing assembly is likely required in order to ensure that the AE sensor is not damaged during use of the bearing assembly. Hence, by the present invention, less modification of the rolling element bearing is required. In particular, there is no need for any modification and/or replacement of the bearing support structure, i.e. bearing housing. Accordingly, by the provision that the AE unit is arranged on the bearing seal, an improved and accurate AE measurement can be carried out without the requirement of having the AE sensor directly mounted on the outer ring of the rolling element bearing. In this manner, there is no need for a compromise between the accuracy of the AE measurements and the available space within the bearing assembly, allowing convenient application of the present invention in various industries.

Preferably, the acoustic emission unit is configured to measure the acoustic emission of the rolling element bearing. The AE signals may be generated within the bearing assembly and transmitted through either the lubrication of the rolling element bearing onto the bearing seal and/or transmitted through the mechanical interface between the outer ring and the bearing seal. Thereby, the acoustic emission unit is preferably configured to measure the acoustic emission of the lubricant. Thus, in the context of the present invention, the acoustic emission unit may be specifically directed to detect lubrication problems in a bearing assembly. As such, the AE unit is configured to detect signs of potential problems before the bearing assembly is damaged. To this end, in various exemplifying embodiments, the bearing seal may retain a lubricant. Apart from that the bearing seals retain a lubricant within the bearing cavity; they are also designed to prevent the ingress of contaminants. The lubricant may be oil, which is used to lubricate one or more rolling element. In another example, the lubricant may be grease.

Moreover, by the present invention, it becomes possible to extend the warning time to failure, and correct the lubrication issue prior to damage of the bearing assembly. Early detection of lubrication problems increases the warning time prior to failure enabling early intervention and problem rectification. It is to be noted that the acoustic emission signal itself is normally band-pass filtered, rectified and enveloped. As mentioned above, analysis is then performed using standard condition monitoring tools.

An acoustic emission signal can be acquired using various sensors. Thus, the acoustic emission unit is advantageously provided in the form of a sensor for measuring a frequency. In one example, the AE unit can be provided in the form of a piezoelectric crystal sensor, which is available from Ferroperm. However, AE sensors are commonly know in the art, and the selection of a suitable AE sensor is ultimately dependent on the desired measurements to be carried out and the size and application of the bearing assembly. Hence, various types, shapes and sizes of the AE unit are conceivable and the nature and design of the AE unit will be apparent to the skilled person in the art. The acoustic emission signal is preferably processed and enveloped using an interface card. Interface cards are commercial available to the skilled person. The interface card can be included in a signal processing unit.

Acoustic emissions cover a wide bandwidth, and generally frequencies from zero Hertz up to several mega Hertz. It is usually subdivided into infrasound covering 0 Hz to about 20 Hz, sound covering about 20 Hz to 20 kHz and ultra sound being above 20 kHz up to several mega Hz. Hence, preferably, the acoustic emission unit is configured to measure frequencies between 100 kHz to 1 MHz. Still preferably, the acoustic emission unit is configured to measure frequencies between 150 kHz-450 kHz, since it has been observed that frequencies in this range amount to a significant release of energy in relation to bearing assembly defects and lubrication issues. In addition, the latter range is particularly associated with asperity contact in rolling element bearings, meaning that unwanted acoustic emissions are filtered out.

Accordingly, by the above arrangement, it becomes possible to enhance the frequencies which are essential for accurate signal processing to reach a diagnosis and suppress the frequencies outside this range.

Preferably, the acoustic emission unit is arranged on the outer surface of the bearing seal, i.e. the air side of the bearing seal. The air side of the bearing seal is typically the opposite side of lubricant-facing surface of the bearing seal.

In various exemplifying embodiments, the bearing seal may be made of metal. A bearing seal made of metal ensures that the acoustic emissions are transformed through the materials in an even more reliable and accurate manner. The bearing assembly is preferably configured for supporting a shaft.

According to an exemplifying embodiment, the rolling element bearing has an inner ring, an outer ring and a set of rolling elements disposed therebetween.

Preferably, the bearing seal is arranged to cover a space S between the inner ring and the outer ring. In this manner, the lubricant leakage from the rolling elements is prevented. It is to be noted that various alternative arrangements of the bearing seal are envisaged within the scope of the invention as long as the bearing seal is capable of preventing leakage of lubricant from the rolling elements bearing. Preferably, the bearing seal is attached to at least the outer ring. In addition, or alternatively, the bearing seal may be attached to the inner ring. Likewise, the bearing seal may be attached to both rings. In this manner, the bearing seal extends from the outer ring to the inner ring. Alternatively, or in addition, the bearing seal may extend from the outer ring to an adjacent component of the inner ring. One example of an adjacent component can be a magnetic impulse ring. The magnetic impulse ring provides a source of variable magnetic fields from which a sensor used within an axletronics sensor detects the magnetic flux change. Typically, the magnetic impulse ring is made of a soft ferrite ring material with a large number of different negative and positive poles. As a magnetic pick-up sensor located inside the axletronics sensor assembly passes the magnetic impulse ring, the magnetic pick-up sensor detects the varying magnetic field and generates an RPM waveworm/signal. Another example of an adjacent component can be a backing ring. The backing ring is arranged to secure the axial position of the bearing assembly on to the shaft. It is even possible that the bearing seal may extend from the outer ring to the bearing housing.

The inner ring, the outer ring and the set of rolling elements are typically retained in a cage. The outer ring is typically stationary, i.e. non-rotational during bearing operation.

The set of rolling elements may, according to an exemplifying embodiment, form a row of aligned rolling elements which extend and roll circumferentially around the inner ring of the bearing assembly. In this manner, the inner ring and the set of rolling elements extend, during operation, around a shaft in an annular configuration.

According to various exemplifying embodiments, the inner ring is provided with an inner raceway. Analogously, the outer ring is provided with an outer raceway. The inner ring is preferably connected to the outer ring via the cage, and/or an additional support structure. The cage is arranged to support the outer ring in relation to the inner ring. The cage may advantageously be configured to control the position of the outer ring cooperating with the set of rolling elements in relation to the first outer ring, such that the bearing assembly allows for misalignment but restricts the axial displacement of the shaft in relation to the inner ring. Moreover, the cage provides a suitable support for operatively coupling the inner and outer rings in relation to each other during operation, and/or in relation to a bearing outer housing. Thereby, the bearing assembly may preferably comprise a bearing outer housing.

According to various exemplifying embodiments, the rolling element bearing is formed of a radial rolling element bearing, a spherical roller thrust bearing, a tapered roller bearing, a cylindrical roller thrust bearing, a thrust ball bearing, an angular contact ball bearing, or a combination of the two or more of these bearing types. For example, the bearing assembly may comprise a first and a second rolling element bearing arrangement, wherein the first and the second rolling element bearings may be formed of different bearing types with different rolling element and raceways designs, such as according to the characteristics of any one of exemplified bearing types described above.

The present invention is particularly suitable for railway bearings. Hence, according to a second aspect thereof, the present invention relates to a railway bearing. In railway bearings, the bearing seal is typically provided in the form of a metal seal cover. Preferably, the metal seal cover is mechanically attached to both the outer bearing ring and the inner bearing ring. Alternatively, the metal seal cover may be in indirect physical contact with the outer ring or the inner ring. The metal seal is usually pressed into the bearing (outer ring) and mate with the inner ring in a labyrinth arrangement. One end, usually the inner ring, must be free to rotate so as to ensure that the bearing assembly is capable of rotating. Accordingly, the bearing assembly can be included in a railway bearing. However, the application of the bearing assembly is not limited to railway bearings; instead the bearing assembly can be included in any suitable industrial environment requiring a bearing assembly.

Hence, the present invention is further advantageous in that it allows the AE unit to be mounted within existing commercially available axletronics housings, e.g. a railway bearing odometer. An axletronics housing uses the magnetic impulse ring of the railway bearing to measure the rpm of the bearings. The gathered information, i.e. the measured acoustic emissions, can then be wirelessly transmitted to a train systems or a remote monitoring system. In various embodiments, the railway bearing may therefore include a magnetic impulse ring. Preferably, the bearing seal extends from the outer ring to the magnetic impulse ring. In this context, the magnetic impulse ring may be referred to as the adjacent component of the inner ring, as mentioned above.

Advantageously, the bearing assembly may comprise a signal processing unit. The signal processing unit is capable of processing the AE signals. As mentioned above, the acoustic emission signal is preferably processed and enveloped using an interface card. In this manner, the signal processing unit may include an interface card. Preferably, the signal processing unit is adapted to determine a rate of leakage of the lubricant from a detected rate of change in the frequency. The signal processing unit may further be adapted to issue an alarm signal when the frequency reaches a predefined threshold corresponding to the maximum level of permitted leakage. Alternatively, or in addition, the signal processing unit may be adapted to issue an alarm signal when the determined rate of leakage exceeds a predefined threshold.

The acoustic emission unit may further be operatively connected to a signal processing unit in order to convert the signal, or detected indication, into a format and range which is suitable for further processing.

Preferably, the acoustic emission unit may be connected to a condition monitoring unit. The function of the condition monitoring unit is to provide a diagnosis of the condition of the relevant bearings. In addition, or alternatively, the condition monitoring unit may be configured to predict and detect failures. As an example, the condition monitoring unit may be directed to detect hissing, crackling and rumbling sounds due to e.g. abrasion, Each of the signal processing conditions may have corresponding alarm signals. Hence, the acoustic emission unit, the signal processing unit and the condition monitoring unit may be operatively connected to an alarm generation unit. Preferably, the alarm generation unit is configured to display a value of each diagnosis via a display. Preferably, the alarm generation unit may be configured to issue a warning or alarm when a rate of change in the detected frequency exceeds one or more predetermined limits.

In various exemplifying embodiments, the signal processing unit may be an integrated part of the bearing assembly. However, the signal processing unit may be arranged remote from the AE unit. Moreover, the condition monitoring unit, the alarm generation unit and the display may be integrated parts of the signal processing unit. However, the condition monitoring unit, the alarm generation unit and the display may also be separate parts within the bearing assembly.

In one exemplifying embodiment, the acoustic emission unit may be provided in the form of a wireless, passive sensor. A wireless sensor has many advantages, e.g. the sensor can be embedded within a carrier material (e.g. a rubber seal lip). In this manner, the elements of the sensor need not be provided with additional sealing. Furthermore, no battery or power supply is required since the energy for resonating the input transducer is obtained from the interrogation signal.

According to a third aspect of the present invention, there is provided a method for measuring acoustic emission in a bearing assembly. In this context, the bearing assembly comprises a rolling element bearing having a bearing seal, and an acoustic emission unit. As mentioned above, the acoustic emission unit is arranged on the bearing seal. The method comprises the step: measuring the acoustic emissions from the rolling element bearing by means of the acoustic emission unit.

Preferably, the method further includes the step of extracting and analysing the measured acoustic emissions by means of a signal processing unit.

Preferably, the method further includes the step of determining the condition of the rolling element bearing and/or a lubricant on the basis of the measured acoustic emissions by means of the signal processing unit.

Preferably, the method further includes the step of generating a diagnosis of the condition of the rolling element bearing and/or lubricant by means of a condition monitoring unit.

One advantage with the proposed method is precisely that it enables an improved and accurate measurement of the acoustic emission of a bearing assembly.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Note that the directions in the following description are used for facilitating the understanding of a positional relation between components in the figures. Therefore, the installation direction, use mode, and the like of the bearing assembly are not specified thereby. The same is applied to other embodiments described below.

Figure 1:
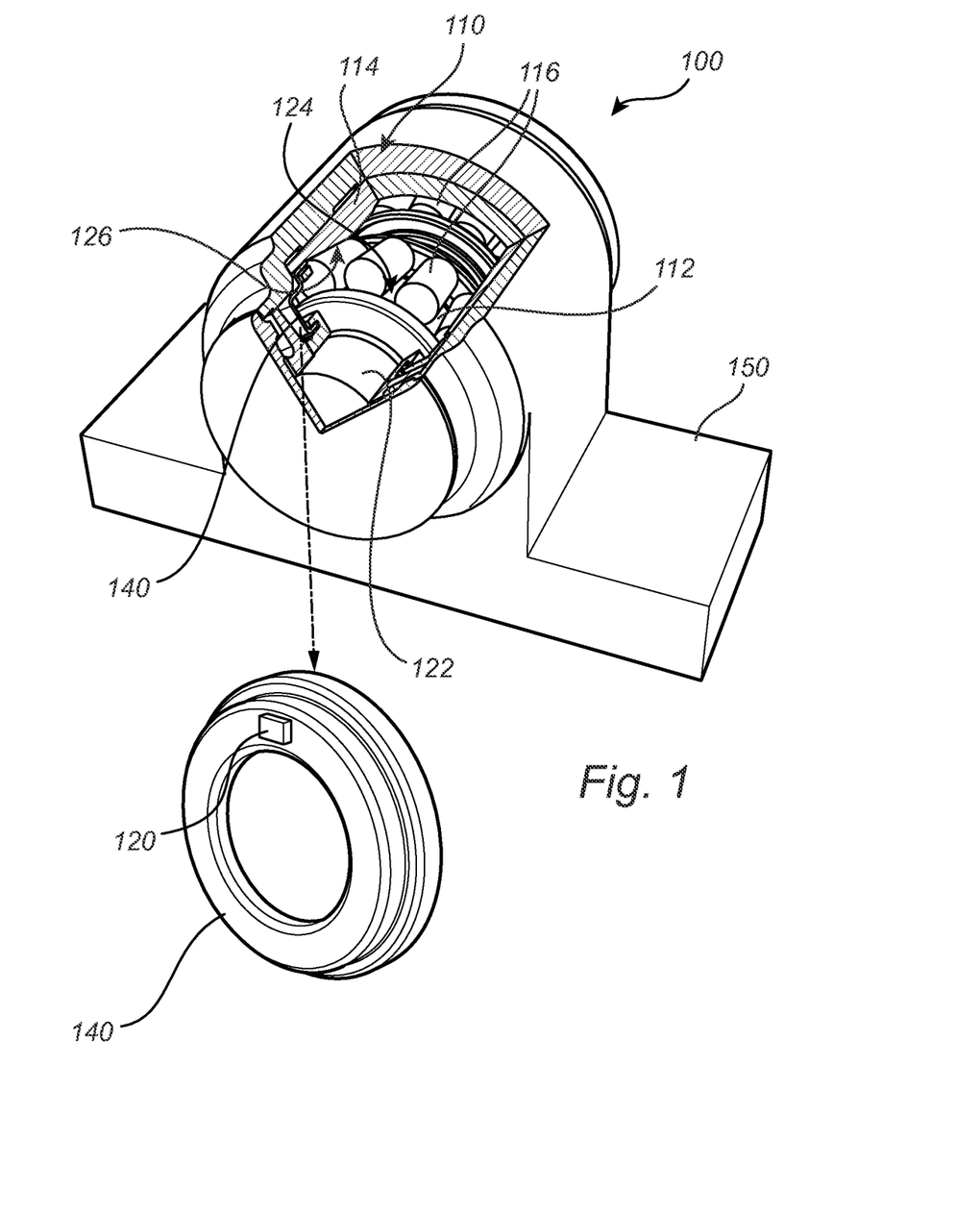
FIG. 1 schematically illustrates a front view of an example of a part of a bearing assembly according to the invention, which bearing assembly comprises an acoustic emission unit.
Figure 2:
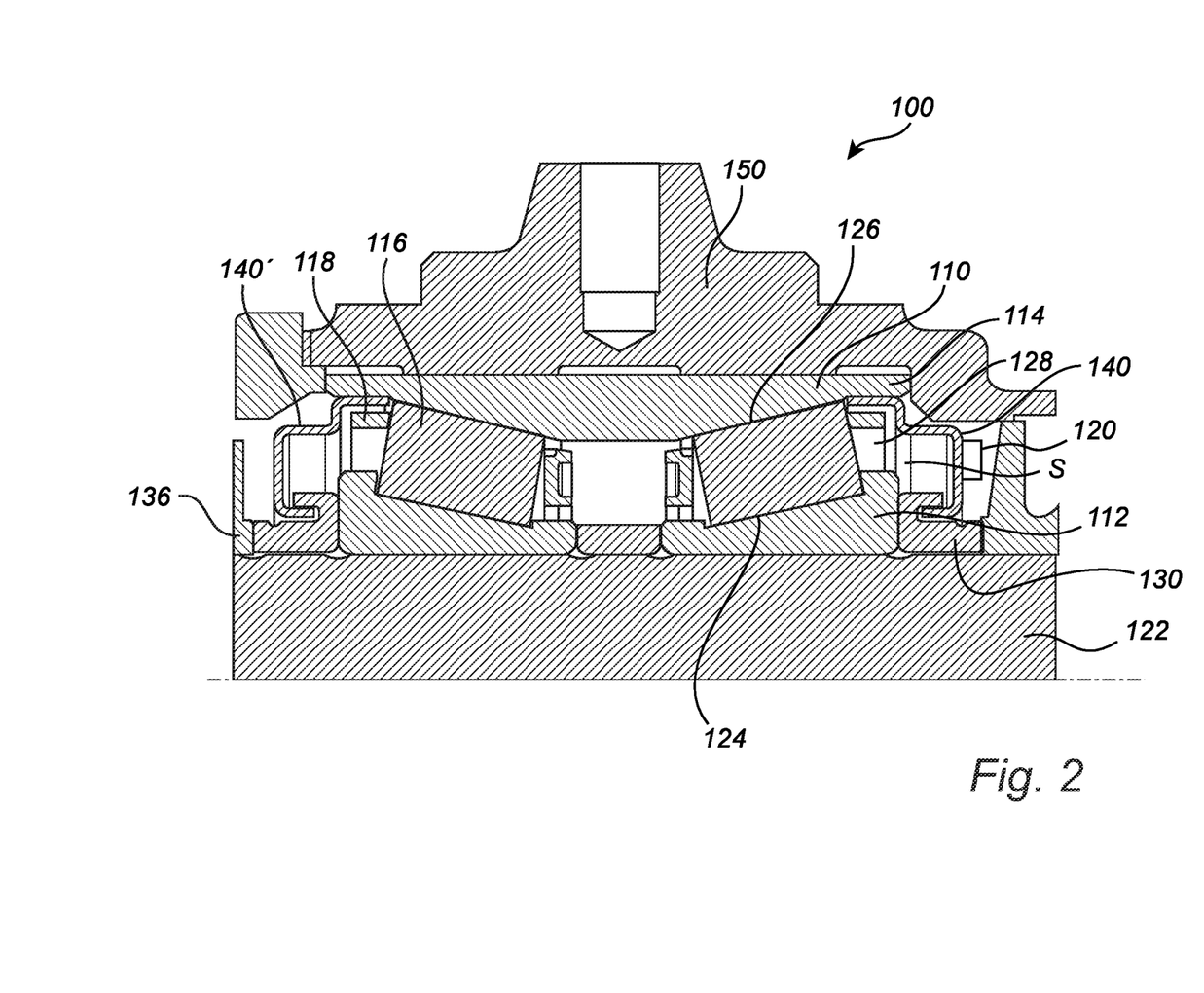
FIG. 2 schematically illustrates a cross-sectional view of an example of a bearing assembly according to the invention, which bearing assembly comprises an acoustic emission unit.

Referring now to the drawings and to FIGS. 1 and 2 in particular, there is depicted an example of a part of a bearing assembly according to example embodiments. The bearing assembly comprises a rolling element bearing 110 and an acoustic emission unit 120. Moreover, the rolling element bearing 110 is here provided with an inner ring 112, an outer ring 114 and a set of rolling elements 116 disposed therebetween. The inner ring, 112, the outer ring 114 and the set of rolling elements 116 are typically retained in a cage or retainer 118. According to various exemplifying embodiments, the cage 118 may be guided and maintained in an intended position in the rolling element bearing 110 by either the inner ring 112 or the outer ring 114. The cage 118 may also be guided on a separate guiding ring (not shown), arranged around a shaft 122. In addition, or alternatively, the separate guiding ring may be arranged in a bearing outer housing 150, as is further explained below. Furthermore, the cage 118 may also be guided by the set of the rolling elements 116. For example, the cage 118 may be formed from a metallic and/or polymeric material. The cage 118 may further be arranged to form the set of the rolling elements 116 and at least one of the inner or outer rings 112, 114 into a self-contained unit which is held together as a single unit by the cage 118.

In the illustrated example in FIGS. 1 and 2, the set of rolling elements 116 are formed of cylindrical roller elements. The set of rolling elements 116 are arranged in an annular circumferential row round an axis of the shaft 122 and interposed between the inner ring 112 and the outer ring 114. Typically, the inner ring 112 comprises an inner raceway 124. The inner raceway 124 typically has a hardened surface layer to withstand loads due to a contact with the rolling elements 116, and to ensure a long service life of the bearing assembly 100. In a similar manner, the outer ring 114 comprises an outer raceway 126. Also the outer raceway 126 typically has a hardened surface layer to withstand loads due to a contact with the rolling elements 116, and to ensure a long service life of the bearing assembly 100. The inner raceway 124 and the outer raceway 126 are in contact with the rolling elements 116 and thereby arranged to cooperate with the rolling elements 116. To this end, the rolling elements 116 roll in relation to and against the raceway, to allow for axial and angular displacement between the inner ring 112 and the outer ring 114. Thereby, the load during operation in an application is transmitted from one raceway to the other at an angle to the bearing axis, which enables accommodation and support for axial loads, as well as radial loads.

As shown in FIGS. 1 and 2, the bearing assembly 100 here includes a bearing outer housing 150 which is arranged to enclose and protect the other components of the bearing assembly 100. Moreover, the bearing outer housing 150 is here arranged to accommodate and control the position of the outer ring 114 of the bearing assembly 100 and integrate the set of rolling elements 116 and the inner ring 112 into an integrated bearing assembly.

The rolling element bearing 110 is further provided with at least a bearing seal 140. In the illustrated example in FIGS. 1 and 2, the rolling element bearing 110 is here provided with a first bearing seal 140 and a second bearing seal 140'. In various exemplifying embodiments, the bearing seal 140, 140' may retain a lubricant 128. That is, the rolling element bearing here comprises a lubricant 128. Thereby, the acoustic emission unit 120 is configured to measure the acoustic emission of the lubricant 128. Apart from that the bearing seals 140 and 140' retain a lubricant 128 within the bearing cavity; the bearing seals 140 and 140' are also designed to prevent the ingress of contaminants. The lubricant 128 may be oil, which is used to lubricate one or more rolling element 116. In another example, the lubricant 128 may be grease.

The bearing assembly 100 may optionally be provided with an electro-osmotic pump (not shown) having a grease reservoir and a grease supply line that extends into a cavity of the bearing assembly. As such, the pump is operated to deliver a small amount of grease directly to a zone of rolling contact. During bearing operation, the supplied grease is over-rolled and base oil is released which forms a lubrication film between the rolling elements 116 and the raceways 124, 126 of the rolling element bearing 110.

As is illustrated in FIGS. 1 and 2, the bearing seal 140, 140' is arranged to cover a space S between the inner ring 112 and the outer ring 114. In this manner, the lubricant 128 is prevented from leaking from the rolling elements 116. It is to be noted that various alternative arrangements of the bearing seal 140 are envisaged within the scope of the invention as long as the bearing seal 140 covers the space S such that the lubricant leakage is prevented. For example, the bearing seals, 140 and 140' can in various exemplifying embodiments be attached to at least the inner ring 112. In addition, or alternatively, the bearing seals 140 and 140' can be attached to at least the outer ring 114. Likewise, the bearing seals can be attached to both rings 112 and 114. In this manner, the bearing seal 140 extends from the outer ring 114 to the inner ring 112. It is also possible within the scope of the present invention that the bearing seals 140 and 140' may be attached to other parts of the bearing assembly 100, such as the bearing outer housing 150. However, as illustrated in FIG. 2, the bearing seal 140 preferably extends from the outer ring 114 to an adjacent component 130 of the inner ring 112. In this example, the adjacent component is provided in the form of magnetic impulse ring, as shown by reference 130 in FIG. 2. The magnetic impulse ring is typically mounted onto the inner ring 112. In the context of the present invention, the adjacent component 130 may be a part of the bearing outer housing 150. Yet another example of an adjacent component can be a backing ring, as illustrated by reference 136 in FIG. 2. The backing ring 136 here is an adjacent component to the inner ring 112, and is arranged to secure the axial position of the bearing assembly on to the shaft 122. Typically, the adjacent component 130 is in physical contact with the inner ring 112, while still allowing the inner ring to be rotatable.

The first bearing seal 140 may optionally be provided with a small opening, to allow the grease supply line having a small diameter, e.g. 0.5 mm, to pass through and emerge in the bearing cavity. In various examples, a discharge opening of the grease supply line is arranged just above a bar of the cage 118, to deliver grease to the rolling contact zone. In this manner, the bearing assembly 100 is configured to provide the rolling element bearing 110 with active lubrication as needed. Sufficient lubrication is essential for the operation of a rolling element bearing and if too much oil or grease is lost, the bearing will fail. This failure can, in turn, result in major damage to a machine which incorporates the bearing. In such cases, it is advantageous to be able to detect leakage, so that the bearing seal can be replaced before damage occurs.

Figure 5:
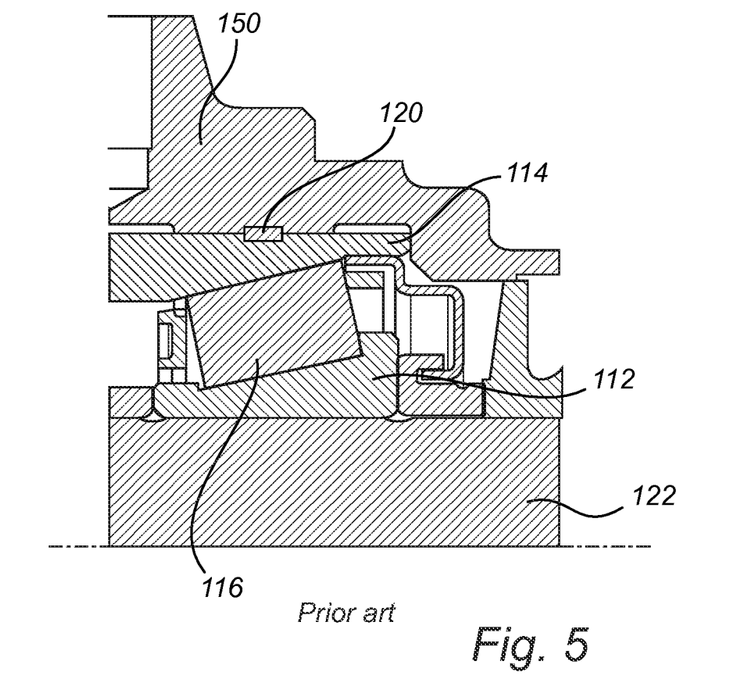
FIG. 5 schematically illustrates an example of a method for measuring acoustic emission of a bearing assembly according to the prior art.

In the prior art, the condition of the lubricant is monitored by measuring the acoustic emission of the bearing assembly. FIG. 5 shows a corresponding prior art embodiment. In this figure, as well as below, reference numeral 120 designates an acoustic emission unit. As is illustrated in FIG. 5, the prior art method is carried out by mounting an acoustic emission sensor directly onto a bearing outer ring surface 114 of a bearing assembly. The attachment of the acoustic emission sensor can for instance be done by gluing or using pressure such that the sensor is firmly maintained on the bearing ring surface. However, as is clear from FIG. 5, there is a lack of space between the bearing housing 150 and the outer ring 114. Hence, it is extremely complicated to correctly positioning the acoustic emission unit 120 on the outer ring 114, while maintaining a high level of quality in the measurements. Even if the acoustic emission unit 120 is correctly arranged on the surface of the outer ring 114, it is still highly likely that it accidently touches an inner surface of the bearing outer housing 150 during operation such that the sensor is damaged.

The present invention provides the possibility to arrange the acoustic emission unit 120 on a location in the rolling element bearing 110 which is less exposed to physical contacts from various components, such as the bearing housing 150, while still obtaining a high level of quality and accuracy in the AE measurements.

To this extent, and as illustrated in FIGS. 1 and 2, the bearing assembly according to the present invention comprises an acoustic emission unit 120 which is arranged on the bearing seal 140. In the context of present invention, the acoustic emission unit 120 is here configured to measure the acoustic emission of the rolling element bearing 110. The acoustic emission unit 120 is preferably arranged on the outer side, or outer surface, of the bearing seal 140, as is illustrated in FIGS. 1 and 2. By the term "outer side of the bearing seal" it is typically meant that side of the bearing seal 140 which is the air side, in contrast to the lubricant-facing side of the bearing seal 140. As shown in FIGS. 1 and 2, the acoustic emission unit 120 is here attached directly to a part of the bearing seal 140. In the context of the present invention, the acoustic emission unit 120 is configured to capture a sound wave pressure and then convert it into electrical signals. Accordingly, an electrical connector or electrical cable (not shown) may be connected to the acoustic emission unit 120. However, it is more common and suitable to use a wireless connection such that the acoustic emission unit 120 and various electrical units can be implemented without any wires or cables. In addition, various units, such as power generation, power storage and wireless data transmission can be fully self-contained in the bearing assembly.

The acoustic emission unit 120 is typically provided in the form of a sensor for measuring a frequency. In a preferred embodiment, the acoustic emission unit 120 typically comprises a sensor in the form of a piezoelectric crystal sensor, which is available from Ferroperm. The acoustic emission sensor may preferably have a frequency range of 100 kHz to 1 MHz. Still preferably, the frequency range of the acoustic emission sensor may be 150 kHz to 450 kHz.

By measuring the frequency, the acoustic emission unit 120 is capable of measuring various conditions of the bearing assembly 100. For instance, an initial change in frequency may indicate a certain defect of the bearing assembly. The frequency can be measured at regular intervals, e.g. once every 15 minutes, in order to provide an indication of the current condition of the bearing assembly 100.

Figure 3:
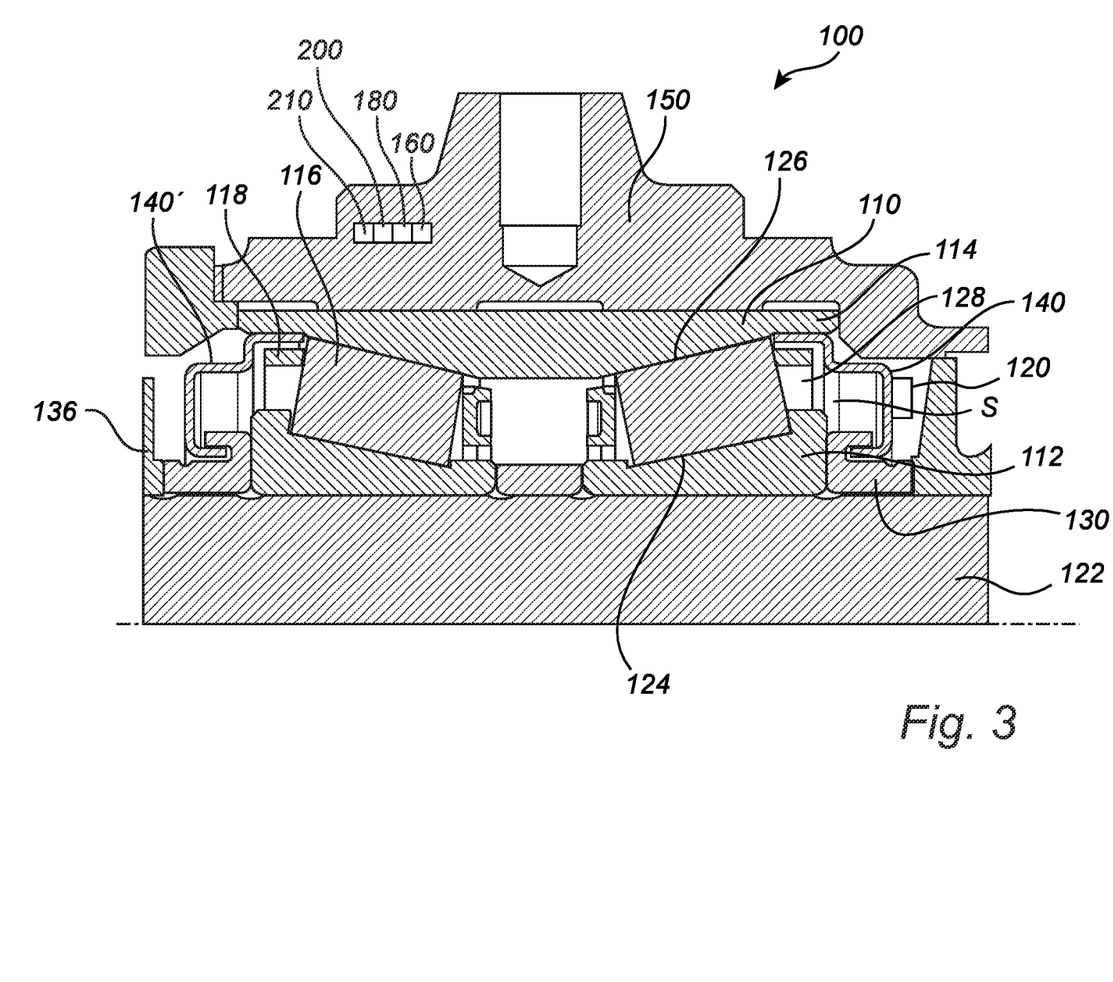
FIG. 3 schematically illustrates a cross-sectional view of a second example of a bearing assembly according to the invention, which bearing assembly comprises an acoustic emission unit.

As schematically illustrated in FIG. 3, the acoustic emission unit 120 may further be operatively connected to a signal processing unit 160 in order to convert the signal, or detected indication, into a format and range which is suitable for further processing. The signal processing unit 160 may further comprise an amplification unit. In addition, or alternatively, the signal processing unit 160 may include an analogue-to-digital conversion unit. In addition, or alternatively, the signal processing unit 160 may include a filtering unit. It is to be noted that all signal processing can be in the analogue domain. However, it is more common to carry out as much processing as possible in the digital domain, and therefore it is desired to position the analogue-to-digital conversion close to the analogue output. The signal processing may also be carried out in a mixture of the analogue and digital domains. The signal processing unit 160 is normally connected to the AE unit 120 by wire to form an electrical connection. However, the signal processing unit 160 may also be wireless connected to the AE unit 120.

As schematically illustrated in FIG. 3, the acoustic emission unit 120 may further be connected to a condition monitoring unit 180. The function of the condition monitoring unit 180 is to provide a diagnosis of the condition of the relevant bearings. In addition, or alternatively, the condition monitoring unit 180 may be configured to predict and detect failures. As an example, the condition monitoring unit 180 may be directed to detect hissing, crackling and rumbling sounds due to e.g. abrasion, In addition, or alternatively, the condition monitoring unit 180 may be directed to detect the loudness of sounds associated with the amount of damage. In addition, or alternatively, the condition monitoring unit 180 may be directed to detect screeching sounds due to metal-to-metal contact. In addition, or alternatively, the condition monitoring unit 180 may be directed to detect whether a fault is associated with a bearing assembly, and/or detect ticking sounds due to bearing damage. Each of the signal processing conditions may have corresponding alarm signals. Hence, the acoustic emission unit 120, the signal processing unit 160, the condition monitoring unit 180 may be operatively connected to an alarm generation unit 200. The alarm generation unit 200 can be configured to display a value of each diagnosis via a display 210. The alarm generation unit 200 can be configured to issue a warning or alarm when a rate of change in the detected frequency exceeds one or more predetermined limits. The value or limit of the alarm generation unit 200 can be set by, for example, a keyboard input. In addition, or alternatively, the alarm generation unit 200 may have pre-set values. In addition, or alternatively, the alarm levels can be of a binary type or a multi-level type. A binary type alarm only has two levels, e.g. on or off, good or bad. A multi-level type alarm can give three or more levels, e.g. no alarm, alert alarm, and critical alarm. For example, when a first predefined limit is exceeded, the alarm generation unit 200 may indicate that the bearing seal 140 must be replaced within one week. A second predefined limit may be set which is indicative of a catastrophic rate of leakage. When the second limit is reached or exceeded, the signal processing unit 160 is suitably configured to trigger a machine shutdown. It is to be noted that various degrees of urgency can be communicated by the alarm signals issued by the alarm generation unit 200.

As may be gleaned from FIG. 3, the signal processing unit 160 is here an integrated part of the bearing assembly. However, the signal processing unit 160 may alternatively be arranged remote from the AE unit 120. Moreover, the condition monitoring unit 180, the alarm generation unit 200 and the display 210 can be integrated parts of the signal processing unit 160. However, the condition monitoring unit 180, the alarm generation unit 200 and the display 210 may likewise be separate parts within the bearing assembly.

It should be noted that FIG. 3 is a simplified illustration of the bearing assembly 100, and that various structures, such as electrical connections to, and within, the bearing assembly and structures for mounting the bearing assembly are not explicitly indicated. Such structures can, however, be provided in many different ways apparent to one skilled in the art.

In all of the embodiments of the present invention, the bearing assembly enables improved and accurate AE measurements of the rolling element bearing 110. In addition, the bearing assembly preferably enables improved and accurate AE measurements of the lubricant 128. This is particularly realized by the provision that the AE unit 120 is arranged on the bearing seal 140. To this end, it is not only possible to gather acoustic emissions measurements from the bearing seal 140, but also from various adjoining bearing structures, e.g. the lubricant 128, the asperity contacts between the raceway surface and the bearing rolling elements 116, the metal support structure of the bearing seal, or other metal parts of the seal. Accordingly, by the provision that the AE unit 120 is arranged on the bearing seal 140, an improved and accurate AE measurement can be carried out without the requirement of having the AE unit 120 directly mounted on the outer ring 114 of the rolling element bearing 110. Thus, there is no need for a compromise between the accuracy and quality of the AE measurements and the available space within the bearing assembly, allowing convenient application of the present invention in various industries.

The bearing assembly according to the present invention is not restricted to the particular structures of the above embodiments. For instance, the acoustic emission unit 120 may be provided in the form of a wireless, passive sensor. In this context, the acoustic emission unit 120 may further comprise a receiving antenna connected to an input transducer, whereby the interrogation signal is sent via an electromagnetic (radio) wave. Preferably, the acoustic emission unit 120 may further comprise a transmitting antenna connected to an output transducer. Analogously, the output signal may also be sent by an electromagnetic (radio) wave. As will be understood by the skilled person in the art, the antennas can be configured as a single closed loop for both receiving and transmitting. A wireless sensor has many advantages, e.g. the sensor can be embedded within a carrier material (e.g. a rubber seal lip). In this manner, the elements of the sensor need not be provided with additional sealing. Furthermore, no battery or power supply is required since the energy for resonating the input transducer is obtained from the interrogation signal.

According to optional embodiments, the shaft 122 may have a tapered or cylindrical bore. In addition, each one of the rings 112, 114 may have tapered or cylindrical bores.

The present invention is particularly suitable for railways bearing. Hence, in a preferred embodiment, a railway bearing is provided which comprises a bearing assembly 100 according to any of the exemplifying embodiments mentioned above.

A railway bearing is typically a large roller bearing having a diameter of at least 250 mm. The large roller bearing comprises two raceway elements, which are embodied as the outer ring 114 and the inner ring 112. Rolling elements embodied as balls 116 are disposed between the raceway elements 124, 126. During movement of the two raceway elements 124, 126, a rolling movement of the balls 116 on the raceway elements occurs. The large roller bearing is typically utilized in installation situations, in which a continuous circling rotation of the outer ring 114 relative to the inner ring 112 takes place or vice versa. This can be the case, e.g., in a railway.

Figure 4:
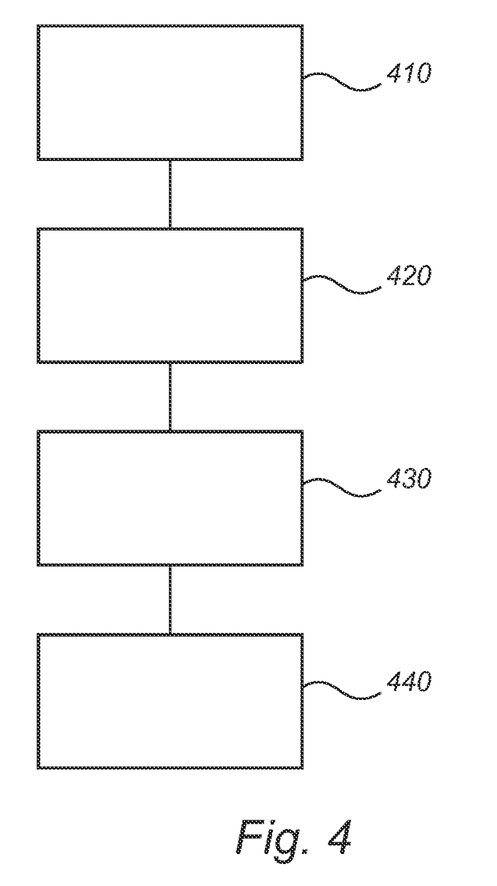
FIG. 4 schematically illustrates a flow-chart of an example of a method according to the present invention.

FIG. 4 shows a flow chart of the method according to the present invention. In a first step 410, the acoustic emissions from the rolling element bearing are measured by means of the acoustic emission unit. As mentioned above, the acoustic emissions are generated from metal-to-metal contact between rolling contact surfaces in the rolling element bearing and are measured using an acoustic emission unit to provide a measured signal. As an optional second step 420, the measured acoustic emissions are extracted and analysed by means of a signal processing unit. In addition, as an optional third step 430, the condition of the rolling element bearing and/or a lubricant is determined on the basis of the measured acoustic emissions by means of the signal processing unit. In addition, as an optional fourth step 440, a diagnosis of the condition of the rolling element bearing and/or lubricant is generated by means of a condition monitoring unit. Moreover, the method may comprise the step of determining a lubrication parameter indicative of the lubrication condition.

Although the figures may show a specific order of method steps, the order of the steps may differ from what is depicted. Also two or more steps may be performed concurrently or with partial concurrence. Such variation may depend on a choice of implementation. All such variations are within the scope of the disclosure.

REFERENCE NUMERALS 110 rolling element bearing
112 inner ring
114 outer ring
116 rolling elements
118 cage
120 acoustic emission unit
122 shaft
124 inner raceways
126 outer raceways
128 lubricant
130 adjacent component of the inner ring
140 bearing seal
150 bearing outer housing
160 signal processing unit
180 condition monitoring unit
200 alarm generation unit
210 display

The invention claimed is:

1. A bearing assembly comprising:
a rolling element bearing comprising:
an inner ring;
an outer ring;
a plurality of rolling elements disposed between the inner and outer ring;
a bearing seal extending over the radial space between the inner and outer ring and configured to help maintain a lubricant between the inner ring and the outer ring the seal having a lubricant side and an air side, the lubricant side being oriented toward the plurality of rolling elements and configured to contact lubricant, the air side of the seal being oriented away from the plurality of rolling elements and configured not to contact the lubricant between the inner ring and the outer ring, the bearing seal having a radially extending seal segment entirely comprised of metal, wherein the metal extends axially across the radially extending seal segment from the lubricant side to the air side, the bearing seal being press fit into the outer ring and forming a labyrinth seal with one of the inner ring and an adjacent component located thereon;
and an acoustic emission unit disposed on the air side of the bearing seal and entirely on the metal of the radially extending seal segment.

2. The bearing assembly according to claim 1, wherein the acoustic emission unit is configured to measure the acoustic emission of the rolling element bearing.

3. The bearing assembly according to claim 1, wherein the bearing seal is retaining the lubricant, and
the acoustic emission unit is configured to measure the acoustic emission of the lubricant.

4. The bearing assembly according to claim 1, wherein the bearing seal extends from the outer ring to the inner ring.

5. The bearing assembly according to claim 1, wherein the bearing seal extends from the outer ring to an adjacent component of the inner ring.

6. The bearing assembly according to claim 1, wherein the acoustic emission unit is provided in the form of a sensor for measuring a frequency.

7. The bearing assembly according to claim 6, wherein the acoustic emission sensor is configured to measure frequencies between 100 kHz to 1 MHz.

8. The bearing assembly according to claim 1, wherein the bearing assembly further comprises a signal processing unit, wherein the signal processing unit is adapted to determine a rate of leakage of the lubricant from a detected rate of change in the frequency.

9. The bearing assembly according to claim 8, wherein the signal processing unit is further adapted to issue an alarm signal when the frequency reaches a predefined threshold corresponding to the maximum level of permitted leakage.

10. The bearing assembly according to claim 8, wherein the signal processing unit is further adapted to issue an alarm signal when the determined rate of leakage exceeds a predefined threshold.

11. A method for measuring an acoustic emission in, the method comprising the steps:
providing the bearing assembly of claim 1; and
measuring the acoustic emissions from the bearing assembly by means of the acoustic emission unit, the acoustic emission unit measuring a frequency,
issuing a warning by an alarm generation unit when a rate of change in the frequency measured by the acoustic emission unit exceeds a first predetermined value,
triggering a shutdown of the bearing assembly by the alarm generation unit when the rate of change in the frequency measured by the acoustic emission unit exceeds a second predetermined value.

12. The method according to claim 11, further comprising the step:
extracting and analyzing the measured acoustic emissions by means of a signal processing unit.

13. The method according to claim 12, further comprising the step:
determining the condition of the rolling element bearing and/or a lubricant on the basis of the measured acoustic emissions by means of the signal processing unit.

14. The method according to claim 13, further comprising the step:

generating a diagnosis of the condition of the rolling element bearing and/or the lubricant by means of a condition monitoring unit.

* * * * *